US009558660B1

(12) United States Patent
Fowe et al.

(10) Patent No.: US 9,558,660 B1
(45) Date of Patent: Jan. 31, 2017

(54) METHOD AND APPARATUS FOR PROVIDING STATE CLASSIFICATION FOR A TRAVEL SEGMENT WITH MULTI-MODAL SPEED PROFILES

(71) Applicant: HERE Global B.V., Veldhoven (NL)

(72) Inventors: James Fowe, Chicago, IL (US); Kyle Jackson, Chicago, IL (US); Bruce Bernhardt, Chicago, IL (US); Sam Radomy, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/815,606

(22) Filed: Jul. 31, 2015

(51) Int. Cl.
*G06F 19/00* (2011.01)
*G08G 1/01* (2006.01)
*G08G 1/052* (2006.01)

(52) U.S. Cl.
CPC .......... *G08G 1/0125* (2013.01); *G08G 1/0133* (2013.01); *G08G 1/052* (2013.01)

(58) Field of Classification Search
CPC ..... G08G 1/0125; G08G 1/052; G08G 1/0133
See application file for complete search history.

(56) References Cited

U.S. PATENT DOCUMENTS 8,504,411 B1 * 8/2013 Subasic .............. G06Q 30/0201 705/14.41
9,183,572 B2 * 11/2015 Brubaker ............... G06Q 30/02
2011/0153195 A1 * 6/2011 Broadbent ......... G01C 21/3626 701/533
2012/0029800 A1 * 2/2012 Kluge .................... G01C 21/32 701/117
2013/0268236 A1 * 10/2013 Yuen .................... A61B 5/0002 702/160
2014/0143184 A1 * 5/2014 Koukoumidis ........ G01C 21/32 706/12
2015/0154328 A1 * 6/2015 Michalke ............ G06F 17/5095 703/1
2015/0213886 A1 * 7/2015 Toda ................... G11C 13/0011 365/148

(Continued)

*Primary Examiner* — Tuan C. To
(74) *Attorney, Agent, or Firm* — Ditthavong & Steiner, P.C.

(57) ABSTRACT

An approach is provided for state classification for a travel segment with multi-modal speed profiles. A traffic processing platform processes and/or facilitates a processing of probe data associated with at least one travel segment to determine that probe data indicates a plurality of speed profiles. The plurality of speed profiles represent one or more observed clusters of speed states. The traffic processing platform also determine that the at least one travel segment exhibits a multi-modality with respect to travel speed based, at least in part, on the plurality of speed profiles. The traffic processing platform then determines at least one likely sequence of speed states for traversing the at least one travel segment based, at least in part, on the one or more observed clusters of speed states and state transition probability information, wherein the state transition probability information represents one or more probabilities for transitioning among the plurality of speed states and causes, at least in part, a classification of at least one hidden state of the at least one travel segment based, at least in part, on the at least one likely sequence of speed states.

20 Claims, 12 Drawing Sheets

(56) References Cited

U.S. PATENT DOCUMENTS

| | | | | |
|---|---|---|---|---|
| 2015/0268056 | A1* | 9/2015 | Gueziec | G01C 21/3492 701/117 |
| 2016/0180705 | A1* | 6/2016 | Liu | G08G 1/0125 701/117 |

* cited by examiner

221

METHOD AND APPARATUS FOR PROVIDING STATE CLASSIFICATION FOR A TRAVEL SEGMENT WITH MULTI-MODAL SPEED PROFILES

BACKGROUND

This invention is related to the field of traffic processing using probe data (e.g., data indicating a position and/or heading of a probe device traveling in a road or travel network). Generally, a primary goal of traffic data providers is the generation of accurate traffic speed information on every road or travel segment within its geographic database. However, one of the most challenging travel segments for estimating traffic information is a travel segment with traffic controls (e.g., stop lights, stop signs, pedestrian crossings, etc.) that can potentially result in reports of low or zero speeds when vehicles stop at the traffic controls even when there is actually no congestion. The presence of such traffic controls can result in a travel segment that has multi-modal traffic speed profiles as observed from collected probe data (e.g., a bi-modality where a higher speed traffic profile can be observed when a stop light is green and lower speed traffic profile can be observed when the stop light is red or yellow). This problem is particularly acute when there is a travel segment that is dense with such traffic control points (e.g., stop lights or stop signs at every block along a street). Accordingly, service providers face significant technical challenges to avoiding false inferences of traffic congestion or other traffic-speed related states (e.g., mode of transport) when processing probe data collected from travel segments that are multi-modal with respect to speed.

SOME EXAMPLE EMBODIMENTS

Therefore, there is a need for an approach for providing state classification for a travel segment with multi-modal speed profiles. In one embodiment, the classification is of a "hidden state" of the travel segment, wherein the hidden state is any state (e.g., traffic speed, traffic congestion, etc.) that is to be inferred from probe state.

According to one embodiment, a method comprises processing and/or facilitating a processing of probe data associated with at least one travel segment to determine that probe data indicates a plurality of speed profiles. The plurality of speed profiles represent one or more observed clusters of speed states. The method also comprises determining that the at least one travel segment exhibits a multi-modality with respect to travel speed based, at least in part, on the plurality of speed profiles. The method also comprises determining at least one likely sequence of speed states for traversing the at least one travel segment based, at least in part, on the one or more observed clusters of speed states and state transition probability information. The state transition probability information represents one or more probabilities for transitioning among the plurality of speed states. The method further comprises causing, at least in part, a classification of at least one hidden state of the at least one travel segment based, at least in part, on the at least one likely sequence of speed states.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of probe data associated with at least one travel segment to determine that probe data indicates a plurality of speed profiles. The plurality of speed profiles represent one or more observed clusters of speed states. The apparatus is also caused to determine that the at least one travel segment exhibits a multi-modality with respect to travel speed based, at least in part, on the plurality of speed profiles. The apparatus is further caused to determine at least one likely sequence of speed states for traversing the at least one travel segment based, at least in part, on the one or more observed clusters of speed states and state transition probability information. The state transition probability information represents one or more probabilities for transitioning among the plurality of speed states. The apparatus further causes, at least in part, a classification of at least one hidden state of the at least one travel segment based, at least in part, on the at least one likely sequence of speed states.

According to another embodiment, a computer-readable storage medium carries one or more sequences of one or more instructions which, when executed by one or more processors, cause, at least in part, an apparatus to process and/or facilitate a processing of probe data associated with at least one travel segment to determine that probe data indicates a plurality of speed profiles. The plurality of speed profiles represent one or more observed clusters of speed states. The apparatus is also caused to determine that the at least one travel segment exhibits a multi-modality with respect to travel speed based, at least in part, on the plurality of speed profiles. The apparatus is further caused to determine at least one likely sequence of speed states for traversing the at least one travel segment based, at least in part, on the one or more observed clusters of speed states and state transition probability information. The state transition probability information represents one or more probabilities for transitioning among the plurality of speed states. The apparatus further causes, at least in part, a classification of at least one hidden state of the at least one travel segment based, at least in part, on the at least one likely sequence of speed states.

According to another embodiment, an apparatus comprises means for processing and/or facilitating a processing of probe data associated with at least one travel segment to determine that probe data indicates a plurality of speed profiles. The plurality of speed profiles represent one or more observed clusters of speed states. The apparatus also comprises means for determining that the at least one travel segment exhibits a multi-modality with respect to travel speed based, at least in part, on the plurality of speed profiles. The apparatus also comprises means for determining at least one likely sequence of speed states for traversing the at least one travel segment based, at least in part, on the one or more observed clusters of speed states and state transition probability information. The state transition probability information represents one or more probabilities for transitioning among the plurality of speed states. The apparatus further comprises means for causing, at least in part, a classification of at least one hidden state of the at least one travel segment based, at least in part, on the at least one likely sequence of speed states.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing state classification for a travel segment with multi-modal speed profiles are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
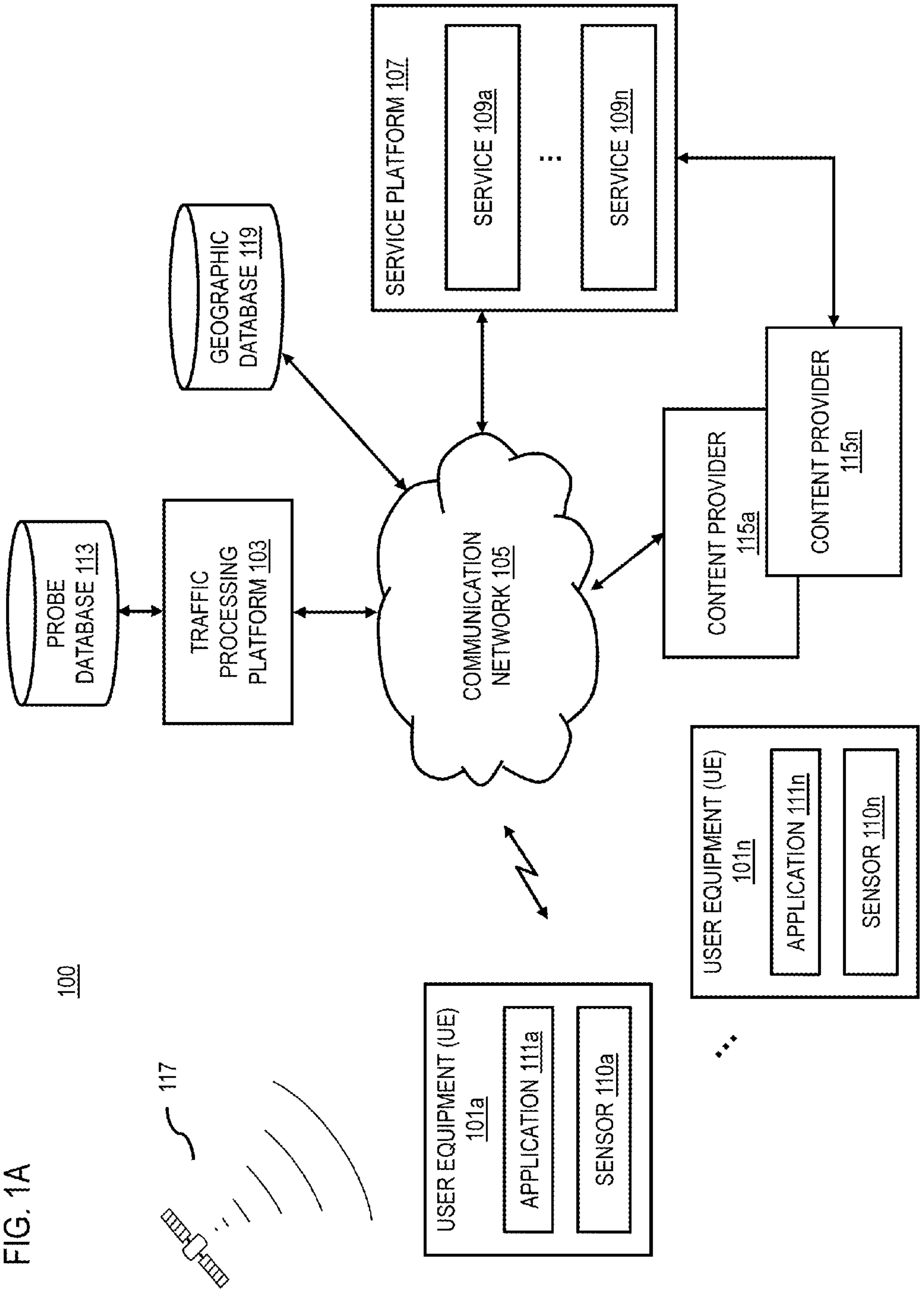
FIG. 1A is a diagram of a system for providing state classification for a travel segment with multi-modal speed profiles, according to one embodiment.

FIG. 1A is a diagram of a system for providing state classification for a travel segment with multi-modal speed profiles, according to one embodiment. As discussed above, providers or traffic data, map data, and other location-based services face significant challenges to ensuring accurate reports of traffic information, particularly on travel segment that are dense with stoplights or other traffic controls that result can result in multiple speed profiles as part of normal operation. For example, probe devices (e.g., global positioning satellite (GPS) probes) may report zero or close to zero speeds when stopped at a traffic light even when there is no actual congestion along the road or travel segment.

Historically, a resultant outcome is that there is a mix of low-speeds (close to zero speed) generated when the light is red or yellow and higher probe speeds generated when the light is green. In one embodiment, this outcome is called a multi-modal traffic condition. More specifically in this example, because the speed is classified as either low speed or high speed, the multi-modality is an example of a bi-modal traffic condition. Although various embodiments described herein are discussed with respect to bi-modality, it is contemplated that the various embodiments are also applicable to multi-modalities that comprise more than two modes.

Accordingly, disambiguation of the actual traffic speed (e.g., the "hidden state" that is to be inferred such as whether the observed probe data indicates an actual traffic jam or merely a transient congestion due to the traffic light or other traffic control) is a major challenge. For example, in a typical set of real probe traffic data collected within a five-minute epoch around a traffic light, the majority of GPS probes shows that the traffic is on the average fast enough (e.g., >17 kph. However, within this five-minute epoch, there can also be a number of GPS probes that were stopped at the stoplight suggesting that the current speed is zero. If a traditional weighted average using only the probe-points is performed, the mean can result in a slow speed suggestion congestion, whereas removing the zero speed data would give a higher mean speed. Knowing what to do in real-time (e.g., determining whether the zero speed is true or false) is difficult.

The problem here is that traffic controls that can stop or slow traffic (e.g., stoplights, stop-signs, pedestrian crossings, etc.) are generally outliers or noise in a typical traffic congestion system. Historically, these types of problems have led to many missed or false congestion reports in traffic processing or classification. For example, if low speed GPS probes on road or travel segments around stoplights are filtered, the filtering can lead to missed congestion; and if the low speed GPS probes are not filtered, false congestion reports can result. This false congestion becomes even more evident when high-resolution traffic publishing is enabled. For example, this makes the false congestion on road segments close to traffic lights become more obvious as it is published separately on the single link of the travel segment at the stoplight.

Accordingly, to address this problem, a system 100 of FIG. 1A introduces a state classification framework for travel segments that are multi-modal with respect to speed using decoding algorithms to infer the appropriate condition or "hidden states" on a road segment with many traffic controls (e.g., stoplights) that considers conditions in links with the travel segment that are proximate to the link with the traffic control or stoplight.

In one embodiment, the system 100 includes a mathematical model and use of a Viterbi algorithm in deciphering a multi-modal traffic distribution across a road/travel segment or strand. As noted previously, in one embodiment, multi-modal with respect to speed refers, for instance, to an observation that there are more than one clusters of speed states/profiles on the links of a travel segment. For example, in these multi-modal scenarios, it may not be clear which of the speed clusters is the reality and which one is the noise. Disambiguation of the speed clusters can be particularly important for arterial roads in which low speed GPS probes can often be data noise due to a stoplight or other traffic controls (e.g., when a bicycle or pedestrian halts traffic at a crossing). In many cases, spatial inference alone may not be enough to disambiguate actual traffic condition especially on travels segments with dense traffic controls (e.g., arterial roads in which upstream and downstream links also have traffic lights, controls, crossings, etc.) that exhibit multi-modality.

For example, in a case where the multi-modality is a bi-modality, some GPS probes suggest higher speed (HS) while some others suggest lower speed (LS). In other cases, there can be more than two modalities (e.g., including a medium speed (MS) or zero speed (ZP) as possible modes). Moreover if the travel segment is dense in traffic controls (e.g., stoplights), then upstream and/or downstream links may also exhibit multi-modality. As a result, the immediate upstream and/or downstream links may not suffice to disambiguate.

While the spatial geometry of the travel/road network remains a key component to solving multi-modal (e.g., bi-modal) traffic situations at traffic control points (e.g., stoplights), the embodiments described herein also represent a more robust solution that can work for any road/travel segment or link exhibiting multi-modality. Accordingly, the system 100 can be used to identify or classify real traffic conditions (e.g., the "hidden states") using the traffic condition in either spatial neighbors with little or sparse number of traffic controls (e.g., stoplights) or with dense traffic controls.

In one embodiment, the system 100 also is a generic framework to accomplish speed-inference on any travel segment by classifying traffic states on a travel segment to different categories. By of example and not limitation, such different categories can include: Free-Flow, Less-than Free-Flow, Slight Congestion, Heavy Congestion, etc. It is contemplated that the system 100 can be configured to classify hidden states of travel segments according to any number or type of categories than can be inferred from the probe data. In one embodiment, the system 100 can then map traffic speeds to these traffic states or categories. For example, the system 100 can categorize speeds as a % of link Free-Flow or any other speed metric. An example of mapping to a % of link Free-Flow is as follows:

speed>75%=Free-Flow;
50%<speed<75%=Less-than Free Flow;
25%<speed<50%=Slight Congestion; and
speed<25%=Heavy Congestion; or
speed>72%=GREEN;
33%<speed<72%=YELLOW; and
speed<33%=Slight Congestion.

In one embodiment, the system 100 uses a Viterbi decoding algorithm to determine or infer the hidden state (e.g., a traffic speed state, traffic congestion state, mode of transport state, etc.) of multi-modal travel segment by modeling the problem, for instance, as a Hidden Markov Model (HMM). For example, with respect to the HMM, the actual state of traffic condition is the hidden state (unknown), and then the system 100 can use the observable traffic states (e.g., as indicated by probe speeds) to find the optimal Viterbi-path across a road/travel segment or a strand of roads with many traffic controls (e.g., traffic lights). In one embodiment, the Viterbi-path would elicit the optimal/likely sequence of states (e.g., speed classifications) across the travel segment.

In one embodiment and as noted above, the speeds obtained from probe data (whether multi-modal/bi-modal or not) are the observable variables of the Viterbi algorithm. The system 100 can then apply the Viterbi algorithm to obtain Viterbi's emission probabilities (e.g., probability of a particular state given an observation) from it. In one embodiment, the transition probabilities of the Viterbi algorithm can be inputted as a likelihood for a change of traffic states from one link to its downstream link (e.g., a part of the road or travel segment was free-flow and then another segment became congested or vice-versa. The transition probability, for instance, would be specified to cater for this condition. Accordingly, the resultant Viterbi-path would be the most likely sequence of speed profiles or an accurate sequence of speed states from one end of the road/travel segment to the other end.

In one embodiment, based on the resultant Viterbi-path (e.g., the likely sequence of speed states over a spatial domain of the travel segment), the system can probabilistically capture and model contributors to probe speeds and decipher the actual traffic condition (e.g., the hidden state) on a road/travel segment or strand.

In an example use case of false congestion around traffic lights of a travel segment, both the upstream and downstream probe speeds (e.g., upstream and downstream with respect to the traffic lights) can be used to confirm that there is actually no congestion within that travel segment or strand. This means that any observed low speeds are local to the link of the travel segment that has traffic lights. In other words, for this use case, the Viterbi-path would align with the faster speed profile observed in the probe data for the travel segment, while the lower speed profiles then become obvious outliers.

In an example use case when there really is congestion, the Viterbi path output would contain a sequence of low speeds for the travel segment (e.g., on the link with the traffic light as well as the downstream and/or upstream links). In one embodiment, observations or probe data from the downstream and/or upstream links can be used to validate the congestion. The system 100 (e.g., a traffic processing engine) can then use the validation as a hint or parameter for weighting of the probe data to classify traffic conditions or other hidden states of the travel segment.

Although various embodiments are described with respect to estimating traffic congestion around traffic lights or other traffic controls (e.g., stop signs, crossings, etc.), it is contemplated that the embodiments are also applicable to other actions related to processing probe data from multi-modal travel segments. By way of example and not limitation, the embodiments may be used to extract data from GPS probes based on different modes of transport that may have different speed profiles or states. For instance, the embodiments can be used to extract pedestrian or bicycle traffic from GPS probe data that may also contain automobile traffic because these different modes of transport have different speed profiles for which hidden states (e.g., mode of transport) can be determined using the embodiments of the processes (e.g., Viterbi algorithm in conjunction with HMM) described herein.

As shown in FIG. 1A, a traffic processing platform 103 of system 100 operates in connection with one or more user equipment (UE) 101*a*-101*n* (also collectively referred to herein as UEs 101) for providing state classification for a travel segment with multi-modal speed profiles. By way of example, the UEs 101 may be an in-vehicle navigation system, a personal navigation device ("PND"), a portable navigation device, a cellular telephone, a mobile phone, a personal digital assistant ("PDA"), a watch, a camera, a computer and/or other device that can perform navigation or location based functions, i.e., digital routing and map display. It is contemplated, in future embodiments, that the cellular telephone may be interfaced with an on-board navigation system of an autonomous vehicle or physically connected to the vehicle for serving as the navigation system. Also, the UEs 101 may be configured to access a communication network 105 by way of any known or still developing communication protocols. Via this communication network 105, the UE 101 may transmit probe data as well as access various network based services for facilitating state classification.

Also, the UEs 101 may be configured with navigation applications 111*a*-111*n* (also collectively referred to as applications 111) for interacting with one or more content providers 115*a*-115*n*, services 109*a*-109*n* of a service platform 107, or a combination thereof. Per these services, the navigation applications 111 of the UE 101 may acquire navigation information, location information, mapping information and other data associated with the current location of the vehicle, a direction or movement of the vehicle along a roadway, etc. Hence, the content providers 115 (collectively referred to as content providers 115) and services 109*a*-109*n* (collectively referred to as services 109) rely upon the gathering of probe data for executing the aforementioned services.

The UEs 101 may be configured with various sensors 110*a*-110*n* (also collectively referred to as sensors 110) for acquiring and/or generating probe data regarding a vehicle, a driver, other vehicles, conditions regarding the driving environment or roadway, etc. For example, sensors 110 may be used as GPS receivers for interacting with one or more satellites 117 to determine and track the current speed, position and location of a vehicle travelling along a roadway. In addition, the sensors 110 may gather tilt data (e.g., a degree of incline or decline of the vehicle during travel), motion data, light data, sound data, image data, weather data, temporal data and other data associated with the vehicle and/or UEs 101 thereof. Still further, the sensors 110 may detect local or transient network and/or wireless signals, such as those transmitted by nearby devices during navigation of a vehicle along a roadway. This may include, for example, network routers configured within a premise (e.g., home or business), another UE 101 or vehicle or a communicable traffic system (e.g., traffic lights, traffic cameras, traffic signals, digital signage). In one embodiment, the traffic processing platform 103 aggregates probe data gathered and/or generated by the UEs 101 resulting from the driving of multiple different vehicles over a road/travel network. The probe data may be aggregated by the traffic processing platform 103 to multi-modal classification.

By way of example, the traffic processing platform 103 may be implemented as a cloud based service, hosted solution or the like for performing the above described functions. Alternatively, the traffic processing platform 103 may be directly integrated for processing data generated and/or provided by one or more services 109*a*-109*n*, content providers 115*a*-115*n* or applications 111*a*-111*n*. Per this integration, the traffic processing platform 103 may perform client-side state classification for travel segments with multi-modal speed profiles.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, traffic processing platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
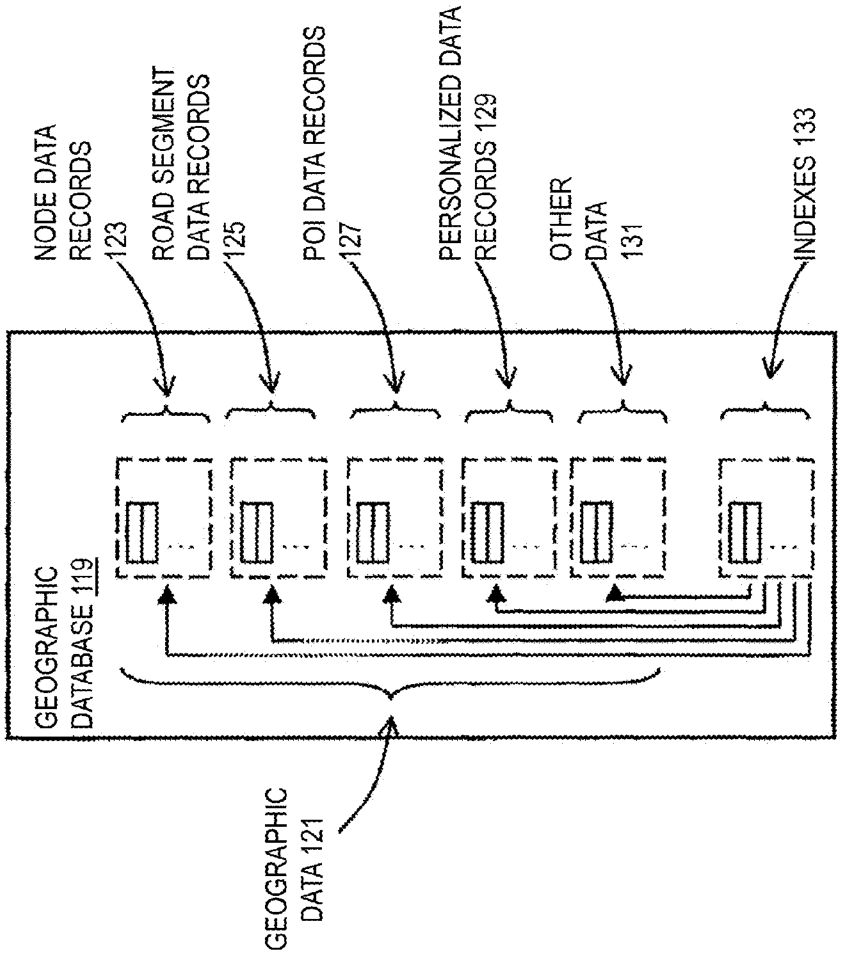
FIG. 1B is a diagram of a geographic database, according to one embodiment.

FIG. 1B is a diagram of the geographic database 119, according to one embodiment. In one embodiment, state classification information, multi-modal detection information, and/or any other information used or generated by the system 100 with respect to providing state classification for a travel segment with multi-modal speed profiles can be stored, associated with, and/or linked to the geographic database 119 or data thereof. In one embodiment, the geographic or map database 119 includes geographic data 121 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 119 includes node data records 123, road segment or link data records 125, POI data records 127, personalized data records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the POI data records 127 may also include information on locations of traffic controls (e.g., stoplights, stop signs, crossings, etc.).

In exemplary embodiments, the road segment data records 125 are links or segments representing roads, streets, or paths, as can be used in the calculated route or recorded route information. The node data records 123 are end points corresponding to the respective links or segments of the road segment data records 125. The road link data records 125 and the node data records 123 represent a road network, such as used by vehicles, cars, and/or other entities. Alternatively, the geographic database 119 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 119 can include data about the POIs and their respective locations in the POI data records 127. The geographic database 119 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city).

In one embodiment, the personalized data records 129 can include any data item used by the traffic processing platform 103 including, but not limited to, usage data, predictor parameter data, personal driving history, travel profile information, user preferences, and/or the like.

The geographic database 119 can be maintained by the content provider in association with the service platform 107 (e.g., a map developer). The map developer can collect geographic data to generate and enhance the geographic database 119. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 119 can be a master geographic database stored in a format that facilitates updating, maintenance, and development. For example, the master geographic database 119 or data in the master geographic database 119 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 119 can be a master geographic database, but in alternate embodiments, the geographic database 119 can represent a compiled navigation database that can be used in or with end user devices (e.g., UEs 101) to provided navigation-related functions. For example, the geographic database 119 can be used with the end user device 101 to provide an end user with navigation features. In such a case, the geographic database 119 can be downloaded or stored on the end user device UE 101, such as in applications 111, or the end user device UE 101 can access the geographic database 119 through a wireless or wired connection (such as via a server and/or the communication network 105), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for ranking of one or more road links.

Figure 2A:
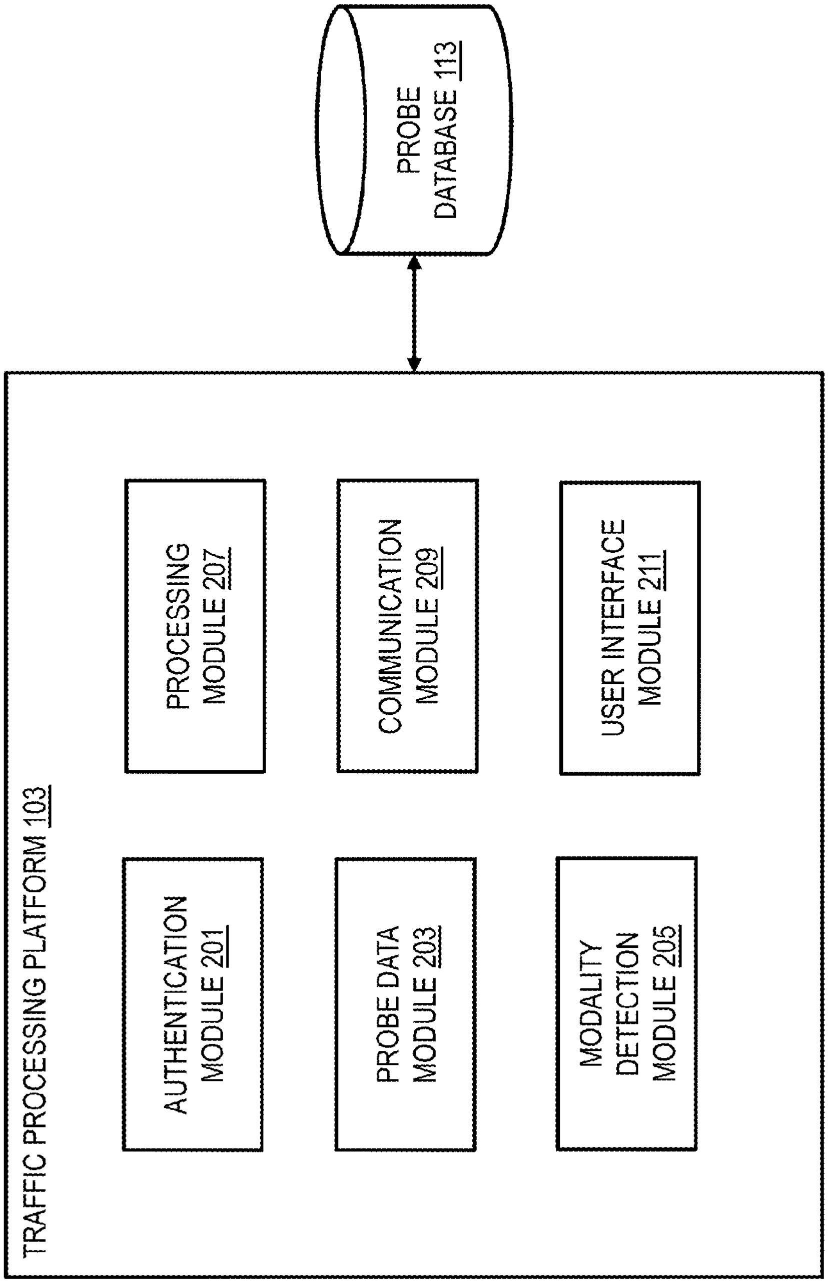
FIG. 2A is a diagram of the components of a traffic processing platform, according to one embodiment.

FIG. 2A is a diagram of the components of a traffic processing platform, according to one embodiment. By way of example, the traffic processing platform 103 includes one or more components for providing state classification of a travel segment with multi-modal speed profiles. It is contemplated that the functions of these components may be combined or performed by other components of equivalent functionality. In this embodiment, the traffic processing platform 103 includes an authentication module 201, a probe data module 203, a modality detection module 205, a processing module 207, a communication module 209, and a user interface module 211.

In one embodiment, the authentication module 201 authenticates users and UE 101 for interaction with the traffic processing platform 103. By way of example, the authentication module 201 receives a request to access the traffic processing platform 103 via an application 111. The request may be submitted to the authentication module 201 via the communication module 209, which enables an interface between the navigation application 111 and the platform 103. In addition, the authentication module 201 may provide and/or validate access by the UE 101 to share probe data and/or other location-based information with the platform 103. It one embodiment, the authentication module 201 may further be configured to support and/or validate the formation of profile by a provider of a service 109 or content provider 115, i.e., for supporting integration of the capabilities for providing state classification of multi-modal travel segments with said providers or services.

The probe data module 203 collects and/or analyzes probe data as generated by one or more authenticated UE 101. For example, the probe data module 203 aggregates the probe data generated by the sensors of the UE 101 for specifying the GPS probe data along with other sensor readings such as acceleration, road curvature, vehicle tilt, driving mode, brake pressure, etc. It then stores this as probe data to database 113 optionally in association with a unique identifier of the vehicle, driver of UE 101 that transmitted the probe data. The probe data module 203 then interacts with the modality detection module 205 to initiate processing of the probe data. In one embodiment, the processing includes, at least in part, data modality detection followed by model formulation for hidden state inference form the multi-modal data.

In one embodiment, the modality detection module 205 processes probe data to detect or determine whether the probe data is multi-modal (e.g., bi-modal) with respect to speed. In one embodiment, the modality detection module 205 (e.g., via modality detection algorithm) processes a set of probe-speed data, inspects the probe data for multi-modality, and then clusters the speeds into partitions corresponding to the detected modes.

Pseudo code is provided in Table 1 below to describe application of the modality detection algorithm in a bi-modality case via a Bi-modal Detection and Clustering (BDC) algorithm.

TABLE 1

```
V ← {a set of probe speeds in an epoch}
function BDC(V):
  s ← STD(V)
  m ← mean(V)
  V ← V ∀ V < m + 2s & V > m − 2s          //first outlier filtering
  d ← Range(V)/8
  for i ← 1 to 8                     //bucketizing
    b_i ← {V ∀ V < max(V) & V > (max(V) − d)}
    V ← V − b_i
  end for
V ← b_i + b_2 +....+ b_8        //restore V
for i ← 2 to 8             //biased outlier rejection in favour of faster speeds

   BiM ← (mean(b_1) − mean(V − b_1)) / Range(V)

  if |b_1| > 3 and BiM > 0.4         //3 & 0.4 are tuning paramters
    then return : {(mean(b_i), mean(V − b_1)}         // HS & LS returned
  else b_1 ← b_1 + b_i
  end if
 end for
end BDC
```

As shown in Table 1, the BDC algorithm detects bi-modality in the probe speed set V, partitions the set V into two clusters (e.g., a high speed (HS) cluster and a low-speed (LS) cluster), and returns the mean speed for each cluster as the LS and HS speed. More specifically, in one embodiment, V (a set of probe data collected over a predetermined epoch (e.g., 5 mins) is processed via the BDC function. For example, the BDC function first determines a standard deviation (s) via and standard deviation function, STD(V), and a mean (m) via a mean function, mean(V). Next, the modality detection module 205 performs a first outlier filtering based on the calculated mean and standard deviation, and calculates a range value for the set.

The filtered set V is then bucketized across discrete value ranges specified over the range of the set V, range(V). In this example, the range(V) is divided into eight buckets of equal range (e.g., the speed range criteria for probe speeds to be assigned to the bucket). Alternatively, it is contemplated that the system 100 can use buckets of unequal sizes or use any number of buckets. In addition, the system 100 can also any function or manual input to specify the bucket ranges. These functions or inputs, for instance, can be specified to tune the modality detection to err on the side of detecting no multi-modality or to err on the side detecting that is multi-modality. The modality detection module 205 assigns the probe speeds of the set V to the respective buckets ($b_1$-$b_8$) based on their speed values.

In one embodiment, the set V is then restored from the bucketized probe speeds while preserving the bucket assignments for further processing. The modality detection module 205 then applies a process to perform biased outlier rejection. In this example, the biased outlier rejection favors faster speeds, and begins be calculating a bucket mean metric, BiM. By way of example, the BiM compares the difference in the mean speeds of the values in the first bucket against the mean speed of the remaining set V (e.g., V minus the first bucket).

In one embodiment, the modality detection module 205 iterates the calculation of each subsequent bucket until at least two criteria are met. As shown, these criteria include whether the number of items in the first bucket is greater than a threshold value (e.g., 3), and whether the BiM is above a threshold value (e.g., 0.4). Evaluating the number of items in the first bucket, for instance, can ensure that there are a sufficient number of probe speed values for calculating the BiM for the bucket. The threshold value for the BiM determines whether there is sufficient separation in the mean values of the first bucket and the remaining set V to indicate multi-modality (e.g., bi-modality in this case).

If the criteria are met, then the mean values of the first bucket and the remaining set V are returned as the mean of the HS speed profile and the mean of the LS speed profile respectively. If the criteria are not met, the modality detection module 205 combines the next bucket with the first bucket, and then repeats the process until the criteria are met or until there are no buckets left. In other words, if the algorithm detects bi-modality (e.g., the LS cluster is not null), then the mean of each cluster as the HS and LS speeds for the distribution. If there is no bi-modality (e.g., the LS cluster is null or below a threshold value), the LS speed is returned as Null and the HS speed would be equivalent to the mean of the entire distribution.

For example, if the BDC algorithm function is applied to an example set V comprising probe speeds (kph) according to the set [16.0, 35.0, 35.0, 2.0, 18.0, 3.0, 21.0, 4.0, 36.0, 6.0, 6.0, 8.0, 9.0] collected over a predetermined time epoch (e.g., 5 minutes), the modality detection module 205 would detect a bi-modality and return an HS mean speed of 35.3 kph and a LS mean speed of 9.3 kph.

Following detection of multi-modality (e.g., bi-modality), the modality detection module 205 interacts with the processing module 207 to initiate hidden state inference (e.g., traffic speed inference, traffic congestion inference, mode of transport inference, etc.). As previously noted, the processing module 207 can use a Viterbi algorithm for hidden state inference. In one embodiment, the processing module 207 solves the multi-modality (e.g., bi-modality) detected by the modality detection module 205 by modeling the problem (e.g., the problem of hidden state inference or classification) as a Hidden Markov Model (HMM). By using an HMM, the processing module 207 presents the multi-modality problem as a statistical model in which there are hidden states that can be predicted based on the either presently observed states or historically observed states.

In other words, with respect to the HMM for a traffic inference use case, the actual state of the traffic condition is the hidden or unknown state. The processing module 207 then uses the observed states (e.g., observed from probe data) to find the optimal Viterbi path (e.g., likely sequence of speed profiles or states) across a road/travel segment or strand of roads with many traffic control points (e.g., stoplights, stop signs, crossings, etc.).

Figure 2B:
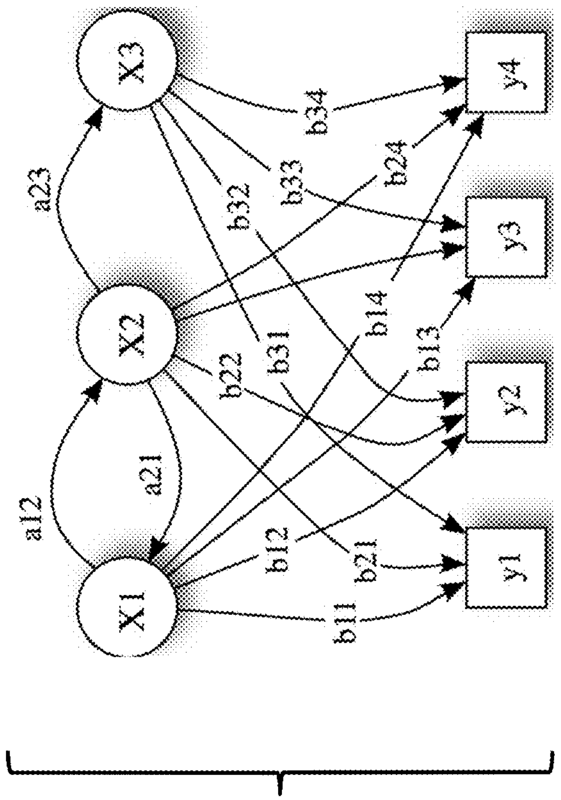
FIG. 2B is a diagram illustrating an example of using a Hidden Markov Model for classifying a hidden state of a travel segment with multi-modal speed profiles, according to one embodiment.

FIG. 2B is a diagram illustrating an example of using a Hidden Markov Model for classifying a hidden state of a travel segment with multi-modal speed profiles, according to one embodiment. As shown, the HMM framework 221 includes the following elements:

X (X1-X3)—possible states (e.g., Free-Flow, Less-than Free Flow, Slight Congestion, and Heavy Congestion);

P(x)—state probabilities (e.g., the chances or probabilities of different traffic states calculated using probe data);

y (y1-y4)—possible observations (e.g., possible observations on links of a travel segment such as probe speeds);

a (a12, a23, a21)—state transition probabilities (e.g., possible change in traffic condition across a road or travel segment, such as from one link to a downstream link of a travel segment);

b (b11, b12, b13, b14, . . . , b34)—output/emission probabilities (e.g., the chances or probabilities of having X occurring on y.

In one embodiment, when applying the Viterbi algorithm, the change of states from X1-to-X2-to-X3 is in a temporal domain (e.g., X1-to-X2-to-X3 for T1-to-T2-to-Tn). However, in one embodiment, when applying the Viterbi algorithm to traffic state inference, the processing module 207 can apply the change of states (e.g., X1-to-X2-to-X3) in a spatial domain that, for instance, would be represented by a sequence of links with the road or travel segment/strand that includes traffic controls (e.g., stoplights, stop signs, crossings, etc.). In other words, when applied in a spatial domain, the change of states (e.g., X1-to-X2-to-X3) would apply to links L1-to-L2-to-Ln, wherein n is the total number of links in a travel segment or strand.

In one embodiment, when applying the Viterbi algorithm to map-matching, the possible states are modeled as possible map-match links over a sequence of probe-points in which the Viterbi path would elicit the most likely route along the probe-trajectory. The links resulting from the map-matching can then be used in various embodiments described herein.

In one embodiment, the possible states are different traffic conditions possible (X) and the observations (y) are the sequential links on the travel segment or strand in which the Viterbi path would help elicit a likely sequence of traffic states across the strand. Accordingly, applying the Viterbi algorithm on this model can obtain the most likely sequence of states, which is a representation of the traffic condition of the travel segment or strand.

It is noted that although various embodiments are discussed with respect to the traffic light or traffic control problem, the embodiments discussed herein are also applicable to any multi-modal traffic data scenario by modeling the possible states according to what is being investigated. For example, if pedestrian data is being searched for in a set of GPS probe data, then the possible states X can be modeled as: X—possible states (pedestrian, car). Similarly, for extracting bicycle data, the possible states can be modeled as: X—possible states (pedestrian, bicycle) or (pedestrian, bicycle, car). For cases where congestion is the priority, then X can be simplified to:

X—possible states (Congested, Not-congested);

X—possible states (green, yellow, red) where green (>72% Free-Flow), yellow (<%72 Free-Flow), and red (<33% Free-Flow).

In one embodiment, the processing module 207 can advantageously apply the simplification of the states to improve the computational speed of the Viterbi algorithm. In cases where greater precision is needed, the processing module 207 can used a larger number of more process states (e.g., states covering every 10 kph interval from 0-300 kph).

In one embodiment, the Viterbi-path is obtained using the Viterbi algorithm given as:

$$V_{l_i,k}=\max_{x\in X}(P(y_{l_i}|k)\cdot a_{x,k}\cdot V_{l_{i-1},x})$$

The output $V_{l_i,k}$ is the value (or the optimal probability) of having state k on link. It uncovers the hidden sequence of states of traffic speeds across the links on the road or travel segment. The travel segment has n number of links $l_i$ starting from i=1 to i=n, and it has the final state k of the last link $l_n$. $\nabla k\in X$.

When n=1, then $V_{l_1,k}=(P(y_{l_1}|k)\cdot\pi_k)$ where $\pi_k$ is the initial probabilities of being in state k. Back-tracing the Viterbi-path, the sequence of states across the links can be obtained.

The final output would be of the form: $x_{l_1}\rightarrow x_{l_2}\rightarrow x_{l_3}\rightarrow \ldots \rightarrow \ldots \rightarrow x_{l_n}$ $\nabla x\in X$ This translate to the set of traffic speeds $x\in X$ on $l_i$ In one embodiment, the emission probabilities $P(y_{l_i}|k)$ may not be directly applicable to traffic state inference. It basically presents the question, "what is the probability of observing the probe speeds y on the link $l_i$ given that the traffic state is k?" (For clarity, let $P(y_{l_i}|k)=P(\text{probes}(l_i)|k)$.)

In this problem space, determining this probability can be complex and counter-intuitive; instead, the reverse conditional probability, specifically $P(k|\text{probes}(l_i))$, is more intuitive and easier to calculate using, for instance, Bayes Theorem as follows:

$$P(\text{probes}(l_i)\,|\,k)=\frac{P(k\,|\,\text{probes}(l_i))\cdot P(\text{probes}(l_i))}{P(k)}$$

In the above equation, $P(\text{probes}(l_i))$=the probability of observing the exact set of probe speeds on link $l_i$. Since the processing module 207 is maximizing across states x, and this probability is independent of the links' states, it is simply a constant, call it c.

$P(k|\text{probes}(l_i))$ is the probability of having state k on link given the set of probe data. In one embodiment, this can be obtained from the actual speeds of this real-time probe data at time t on link $l_i$.

P(k) is the historical probability of having state k on link $l_i$ at the time t (or epoch) when traffic is being estimated.

Therefore, for this traffic state or speed inference problem, the Viterbi algorithm as a function of instantaneous time t can be given as:

$$V_{l_i,k}(t)=\max_{x\in X}\left(\frac{P(k\,|\,\text{probes}(l_i(t)))}{P(k(t))}\cdot a_{x,k}\cdot V_{l_{i-1},x}(t)\right)$$

In one embodiment, $a_{x,k}$ is applied to punish a huge change (e.g., greater than a threshold value) in average speed across a road-segment as this is not expected. The transition probability equation basically states that it is believed that the average traffic speed of state x (at link Li−1) and the average traffic speed of state k at link Li (its nearest neighbor link downstream) should be closely similar average speeds.

As previously noted, although the example presented above is with respect to traffic state inference, it is contemplated that the modality detection and modeling (e.g., HMM in conjunction with a Viterbi algorithm) can be used by the processing module 207 for classifying any hidden state of travel segments that exhibit multi-modality with respect to speed.

In one embodiment, once hidden state is inferred based on the observed probe data, the processing module 207 can optionally interact with the communication module 209 and/or the user interface module 211 to publish and/or present the inferred hidden states.

It is further noted that the user interface module 211 may operate in connection with the communication module 209 to facilitate the exchange of tunnel speed information and vehicle status information via the communication network 105 with respect to the services 109, content providers 115 and applications 111. Alternatively, the communication module 209 may facilitate transmission of the inferred hidden states and related information directly to the services 109 or content providers 115.

The above presented modules and components of the traffic processing platform 103 can be implemented in hardware, firmware, software, or a combination thereof. Though depicted as a separate entity in FIG. 1A, it is contemplated that the platform 103 may be implemented for direct operation by respective UEs 101. As such, the traffic processing platform 103 may generate direct signal inputs by way of the operating system of the UE 101 for interacting with the application 111. In another embodiment, one or more of the modules 201-211 may be implemented for operation by respective UEs as a platform 103, cloud based service, or combination thereof.

Figure 3:
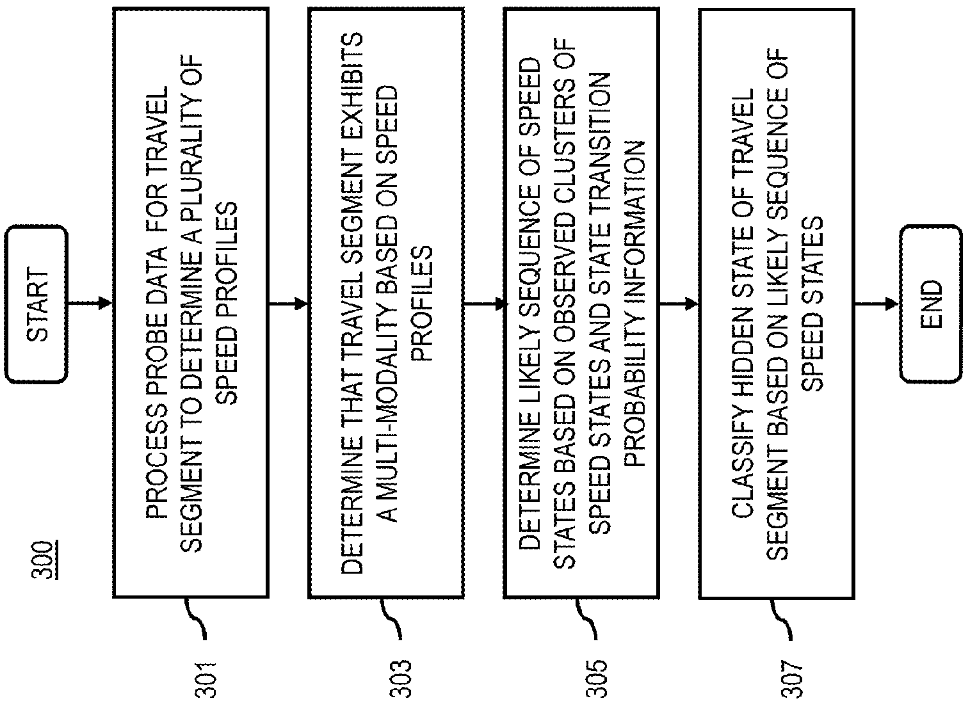
FIG. 3 is a flowchart of a process for providing state classification for a travel segment with multi-modal speed profiles, according to one embodiment.
Figure 9:
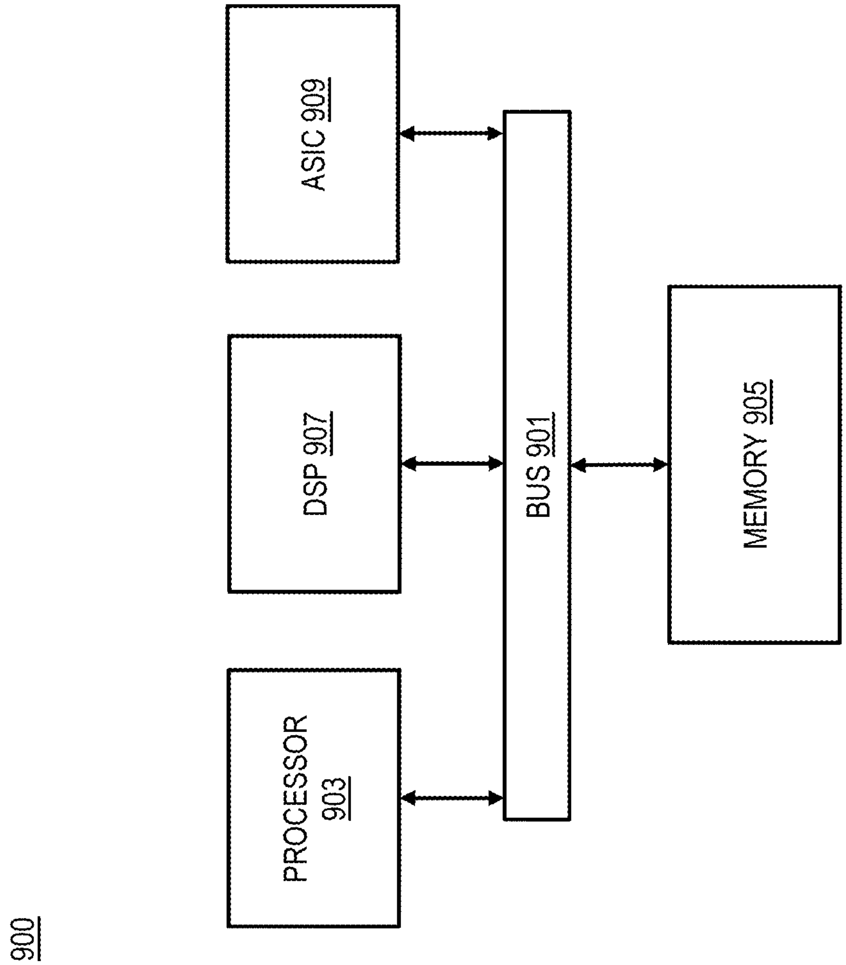
FIG. 9 is a diagram of a chip set that can be used to implement an embodiment of the invention.

FIG. 3 is a flowchart of a process for providing state classification for a travel segment with multi-modal speed profiles, according to one embodiment. In one embodiment, the traffic processing platform 103 performs the process 300 and is implemented in, for instance, a chip set including a processor and a memory as shown in FIG. 9.

In step 301, the traffic processing platform 103 processes and/or facilitates a processing of probe data associated with at least one travel segment to determine that probe data indicates a plurality of speed profiles, wherein the plurality of speed profiles represent one or more observed clusters of speed states. For example, the traffic processing platform 103 can apply the modality detection algorithm described above (e.g., the BDC algorithm) to partition (if possible) a set of probe data into different speed profiles. In one example where the traffic processing platform 103 is configured for determining bi-modality, the speed profiles may, for instance, include a high speed (HS) profile and a low speed (LS) profile. In a multi-modality use case with more than two possible modes (e.g., more than two speed profiles), the traffic processing platform 103 may partition the probe data into any number of corresponding speed profiles.

In one embodiment, the at least one travel segment includes one or more traffic controls operating in one or more links of the at least one travel segment. In one embodiment, the one or more traffic controls include, at least in part, one or more traffic stoplights, one or more crossings, or a combination thereof. As previously discussed, the presence of such traffic controls can result in a multi-modal traffic speed distribution. For example, a LS profile may be observed for probes that have stopped or slowed by a red or yellow traffic light; while a HS profile may be observed for probes that pass through a travel segment under a green traffic light and did not have to stop. Similarly, different speed profiles may also be present in the context of crossings (e.g., when pedestrians are present, cars may stop to wait for pedestrians to cross a road segment), stop signs, etc.

In step 303, the traffic processing platform 103 determines that the at least one travel segment exhibits a multi-modality with respect to travel speed based, at least in part, on the plurality of speed profiles. For example, the traffic processing platform 103 may determine that a travel segment is multi-modal if the partitioning of the probe data into multiple speed profiles (e.g., as performed in step 301) is successful (e.g., the partitioning does not result in only one set that is not a null set and/or mean probe speeds values for multiple speed profiles).

In one embodiment, the multi-modality is a bi-modality comprising a high-speed profile and a low-speed profile. As described above, the bi-modality of the probe data can be common in traffic state inference cases (e.g., corresponding to when a car is either stopped at a traffic light or is not stopped at a traffic light). In other cases, more than two modes (e.g., speed profiles) may be constructed more precise classification is desired. For example, in the traffic light example, three speed profiles (e.g., medium speed (MS) in addition to HS and LS) may correspond to traffic slowed by a yellow traffic light versus completely stopped at a red light and completely free flowing at a green light.

In step 305, the traffic processing platform 103 determines at least one likely sequence of speed states for traversing the at least one travel segment based, at least in part, on the one or more observed clusters of speed states and state transition probability information, wherein the state transition probability information represents one or more probabilities for transitioning among the plurality of speed states. In one embodiment, the determination of the at least one likely sequence of speed states, the classification of the at least one hidden state, or a combination thereof is based, at least in part, on a Viterbi algorithm. As discussed previously, in the context of a Viterbi algorithm, the likely sequence of speed states corresponds to a Viterbi path.

In one embodiment, the traffic processing platform 103 causes, at least in part, a modeling of one or more possible hidden states, one or more state probabilities, one or more possible observed clusters of speed states, the state transition probability information, model output probability information, or a combination thereof, wherein the determination of the at least one likely sequence of seep states is based, at least in part, on the modeling. In one embodiment, the modeling is based, at least in part, on a Hidden Markov Model (HMM) as an underlying framework for solving the problem of state inference given a set of presently or historically observed states (e.g., observed via probe data).

In one embodiment, the one or more possible hidden states is a traffic speed state, a traffic congestion state, or a combination thereof.

In one embodiment, the traffic processing platform 103 determines the at least one likely sequence of speed states with respect to at least one spatial domain by causing, at least in part, a map-matching of the at least one likely sequence of speed states to the at least one travel segment, one or more links of the at least one travel segment, or a combination thereof. When applied across a spatial domain, the likely sequence of speed states represents a sequence of speed states that occur over the links of a travel segment within a given time epoch.

In one embodiment, the traffic processing platform 103 can apply any number or type of processes to generate the travel segment or strands that the Viterbi algorithm would run on. For example, the travel segments or strands can be generated via off-line and/or dynamic/real-time processes. Examples of off-line processes include, but are not limited to:

(1) map-defined link attributes of links with traffic control attributes/flags (e.g., flags for stoplights, stop signs, crossings, etc.);

(2) pre-defined road-segments with uniform traffic capacity and uniform traffic control density; and (3) a bi-modality or multi-modality search algorithm that uses historical data to search for strands of travel segments with several contiguous links showing high frequency of multi-modality (e.g., bi-modality).

Example of dynamic/real-time processes include, but are not limited to:

(1) This can be achieved by processing every link with a traffic control (e.g., stoplight, stop signs, crossings, etc.) attribute/flag differently. The dynamic strand can be generated by adding S number of contiguous upstream and downstream links to the link having a traffic control attribute/flag.

(2) A dynamic strand can be generated for any link in processing that exhibits bi-modal or multi-modal speed distribution. Adding S number of contiguous upstream and downstream links to the link of interest to form a strand of maximum length L can result in the desired strand.

In step 307, the traffic processing platform 103 causes, at least in part, a classification of at least one hidden state of the at least one travel segment based, at least in part, on the at least one likely sequence of speed states. An example process for performing the classification is described with respect to FIG. 4 below.

Figure 4:
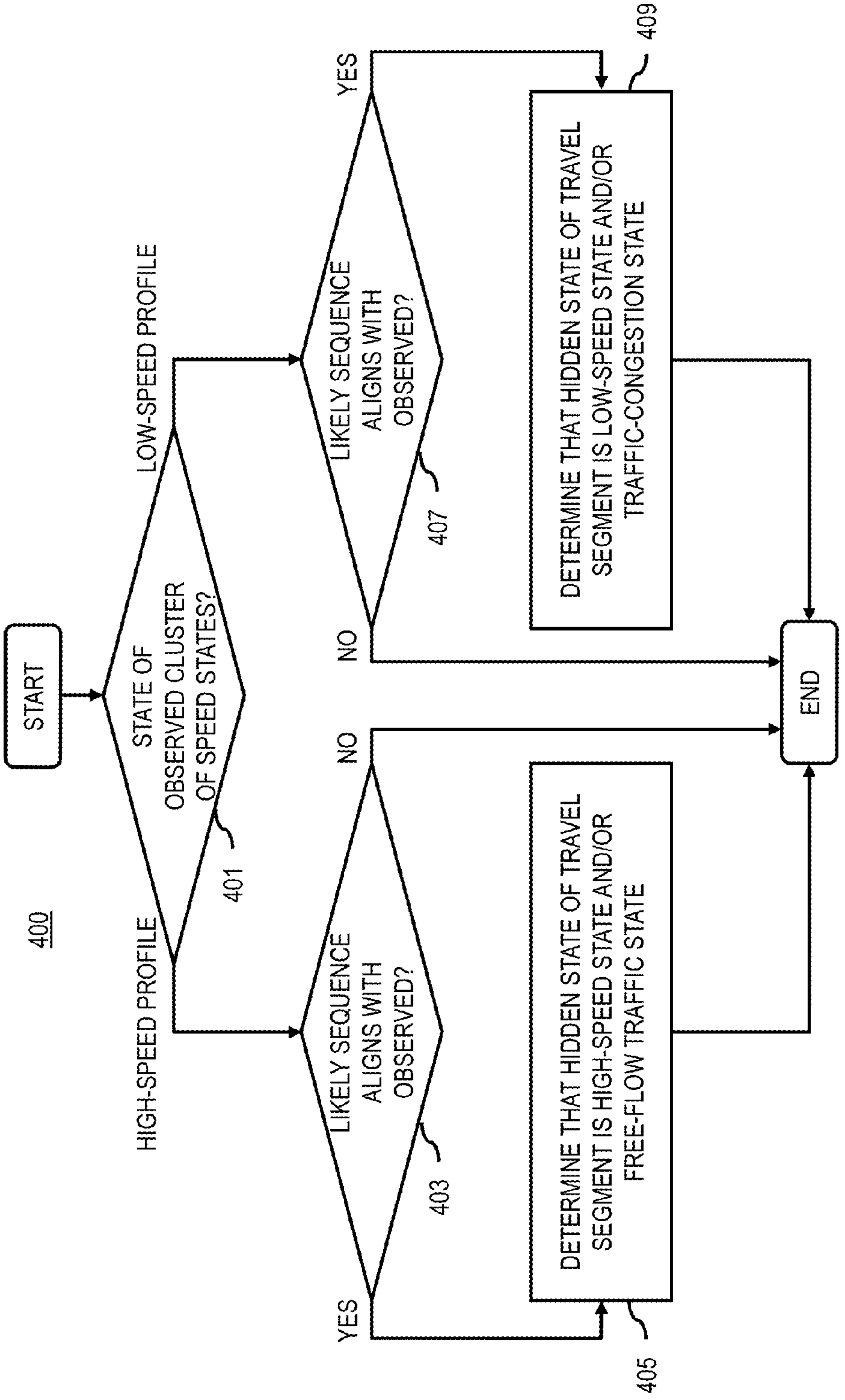
FIG. 4 is a flowchart of a process for determining a hidden state of a multi-modal travel segment based on observed clusters of speed states, according to one embodiment.

FIG. 4 is a flowchart of a process for determining a hidden state of a multi-modal travel segment based on observed clusters of speed states, according to one embodiment. In one embodiment, the traffic processing platform 103 performs the process 400 and is implemented in, for instance, a chip set including a processor and a memory as shown in FIG. 9. More specifically, FIG. 4 illustrates an example of classifying hidden states that are traffic-related inferences in a bi-modal travel segment exhibiting, for instance, a high-speed profile and a low-speed profile. By way of example, the bi-modality of the travel segment may result from the presence of traffic controls (e.g., stoplights, stop signs, crossings, etc.) present along the travel segment, particularly when the number of traffic controls are dense.

In summary, the traffic processing platform 103 determines that the at least one hidden state is a high-speed state, a free traffic-flow state, or a combination thereof if the one or more observed clusters of speed states at least substantially corresponds to the high-speed profile and the at least one likely sequence of speed states is at least substantially aligned with the one or more observed clusters of speed states. Conversely, the traffic processing platform 103 determines that the at least one hidden state is a low-speed state, a traffic congestion state, or a combination thereof if the one or more observed clusters of speed states at least substantially corresponds to the low-speed profile and the at least one likely sequence of speed states is at least substantially aligned with the one or more observed clusters of speed states.

As shown in FIG. 4, in step 401, the traffic processing platform 103 determines whether the state of an observed cluster of speed states matches either the high-speed profile or the low-speed profile. In one embodiment, the traffic processing platform 103 can determine the mean speed of the observed clusters and determine whether the observed mean speed more closely matches the determined mean speed of the high-speed profile of the determine mean speed of the low-speed profile.

If the observed cluster speed at least substantially corresponds or matches the high-speed profile, then traffic processing platform proceeds to step 403. In one embodiment, "substantially' corresponds or matches refers to matching the within a predetermined acceptance window. The window can larger is looser matching is to be performed or smaller if tighter matching is to be performed.

In step 403, the traffic processing platform 103 determines whether the likely sequence of speed states (e.g., the Viterbi path) is aligned with the observed with the cluster (e.g., the observed cluster corresponding to the high-speed profile). If the likely sequence of speed states aligns with the observed cluster, the traffic processing platform 103 determines that the hidden sate of the travel segment is a high-speed and/or free-flow traffic state (step 405).

If the traffic processing platform 103 determines that the observed clusters of speed states at least substantially matches or corresponds to the low-speed profile, then the traffic processing platform 103 proceeds to step 407.

In step 407, the traffic processing platform 103 determines whether the likely sequence of speed states (e.g., the Viterbi path) is aligned with the observed with the cluster (e.g., the observed cluster corresponding to the low-speed profile). If the likely sequence of speed states aligns with the observed cluster, the traffic processing platform 103 determines that the hidden sate of the travel segment is a low-speed and/or traffic congestion state (step 409).

Figure 5:
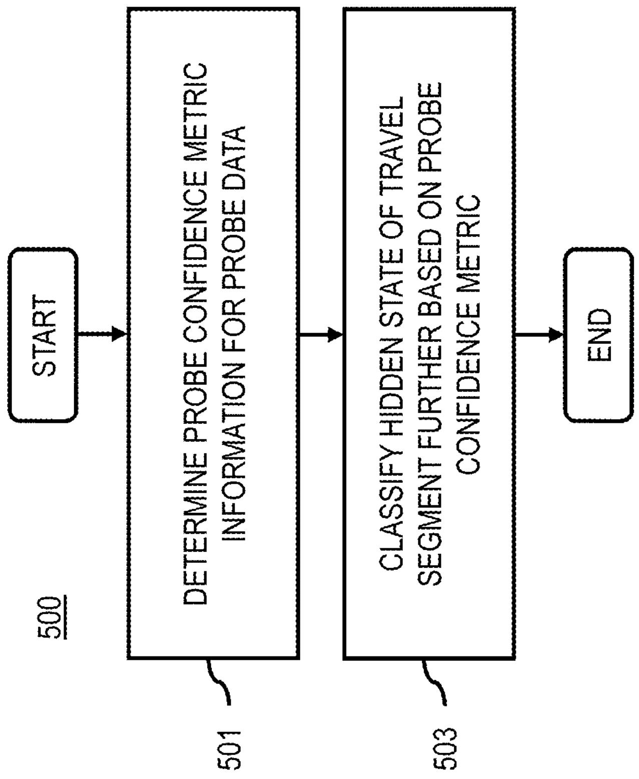
FIG. 5 is a flowchart of a process for determining Probe Confidence Metric information for providing state classification for a travel segment with multi-modal speed profiles, according to one embodiment.

FIG. 5 is a flowchart of a process for determining Probe Confidence Metric information for providing state classification for a travel segment with multi-modal speed profiles, according to one embodiment. In one embodiment, the traffic processing platform 103 performs the process 500 and is implemented in, for instance, a chip set including a processor and a memory as shown in FIG. 9.

In step 501, the traffic processing platform 103 determines probe-confidence-metric (PCM) information for the probe data based, at least in part, on the modeling. In one embodiment, the traffic processing platform 103 attaches to probes and probe-paths that contribute to the probe data used for providing hidden state classification for multi-modal travel segments. In one embodiment, the PCM determination is performed before aggregation of the probe data so that the aggregators can use the weighted PCM to compute weighted averaging (e.g., of probe speeds) that can produce better traffic estimation or hidden state classification. In one embodiment, the PCM is computed in the following range: $0<PCM<1_x$.

In one embodiment, the traffic estimation or classification can be represented using, for instance, colors (e.g., green=no congestion, yellow=light congestion, red=heavy congestion) or any other representation. The pseudo code provided in Table 2 below illustrates an example process for calculating both the PCM for each probe as well as the color or other representation of traffic states for each link $l_i$.

TABLE 2

```
For each color c:
  For each probe p on l_i:
    IF p => c:
      PCM(p) = V(c|l_i)^2 * P(c|l_i)
  IF V(c|l_i) = MAX[ V(c|l_i) ]:
    COLOR(l_i) = c
End For
Normalize PCM(p) over all possible colors c on l_i
```

As shown in Table 2, the PCM weighting is allocated to each probe that matches each Viterbi path output (e.g., a color representation—e.g., green, yellow, red —representing the real traffic state). In one embodiment, the process of Table 2 uses the last Viterbi state probability to estimate the PCM and also ensure that the actual real probes marginal probabilities are relevant to the hidden state inference problem.

In step 503, the traffic processing platform 103 causes, at least in part, a classification of the at least one hidden state based, at least in part, on the probe-confidence metric information.

Figure 6:
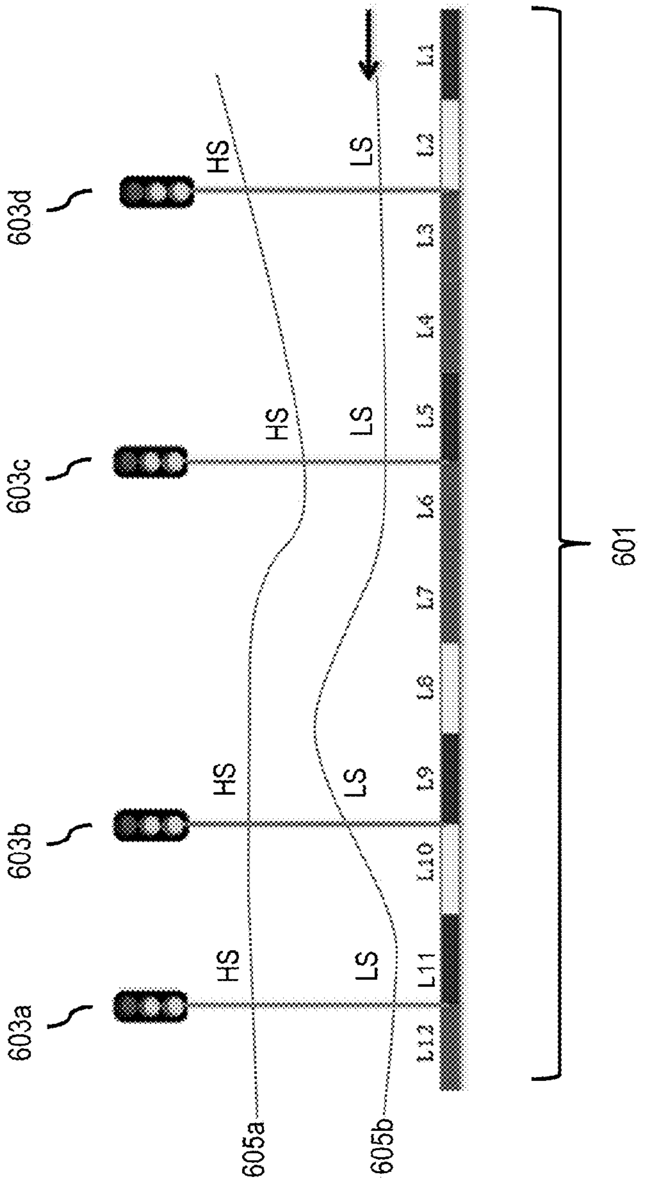
FIG. 6 is an example of estimating traffic states for a travel segment that is traffic control dense, according to one embodiment.

FIG. 6 is an example of estimating traffic states for a travel segment that is traffic control dense, according to one embodiment. More specifically, the example of FIG. 6 involves applying HMM with a Viterbi algorithm to solve a typical traffic light problem on a particular travel segment 601 that is dense with traffic lights 603*a*-603*d* (also collectively referred to as traffic lights 603) with n number of links and n=12, resulting in links L1-L12. In one embodiment, the links are color coded GREEN, YELLOW, and RED to represent probe speed in the link. Although color is not indicated in FIG. 4, the links are color coded as follows: L3, L4, L6, L7, and L12 are GREEN; L2, L8, and L10 are YELLOW; and L1, L5, L9; and L11 are RED).

In this example, let the sample space of possible hidden states X be given as:

X={RED, YELLOW, GREEN}→GREEN(>72% FF), YELLOW(<72% FF, >33% FF), RED(<33% FF)

Let observation y be given as $y=l_1, l_2, \ldots, l_{12}$

For simplicity, let the historical probabilities for P(k(t)) be:

P(RED(t))=0.3, P(YELLOW(t))=0.3, P(GREEN(t))=0.4

And let the transition probabilities $a_{x,k}$ be:

$a_{GREEN,GREEN}=0.9$, $a_{GREEN,YELLOW}=0.5$, $a_{GREEN,RED}=0.1$, $a_{YELLOW,YELLOW}=0.8$, $a_{YELLOW,GREEN}=0.6$, $a_{YELLOW,RED}=0.3$ $a_{RED,RED}=0.7$, $a_{RED,YELLOW}=0.6$, $a_{RED,GREEN}=0.2$

In one embodiment, $a_{x,k}$, could also be derived from historical traffic pattern that captures the frequency of transition between the colors (states). In other embodiments, $a_{x,k}$ can be a function of the real-time data using an equation.

The marginal probabilities $P(k|l_i(t))$ would be obtained from real-time probes data on the link $l_i$ at time t.

For example if speeds(kph) in probes$(l_1(t))$=141,39,1,20,3,401 and probes$(l_2(t))$={41,39,30,20,25,40} with both link's FF=50 kph.

Then $P(GREEN|l_1(t))=3/6$; $P(YELLOW|l_1(t))=1/6$; $P(RED|l_1(t))=2/6$;

Then $P(GREEN|l_2(t))=3/6$; $P(YELLOW|l_2(t))=3/6$; $P(RED|l_2(t))=0/6$;

Table 3 below provides example probe data associated with the travel segment 601.

TABLE 3

| Links | Probe Speeds | Mean (Color) | Bi-Modal? |
|---|---|---|---|
| L1 | 16, 35, 20, 18, 3, 21, 4, 36, 6, 6, 8, 9 | 15.2 (RED) | YES |
| L2 | 16, 65, 0, 90, 18, 30, 2, 1 | 27.8 (YELLOW) | YES |
| L3 | 40, 36, 60, 46, 44, 51, 20 | 42.4 (GREEN) | NO |
| L4 | 40, 36, 60, 46, 44, 51, 20 | 42.4 (GREEN) | NO |
| L5 | 40, 36, 6, 46, 30, 20, 0, 1, 0, 2, 3, 0, 0 | 14.1 (RED) | YES |
| L6 | 40, 36, 60, 46, 44, 51, 20 | 42.4 (GREEN) | NO |
| L7 | 40, 36, 60, 46, 44, 51 | 46.2 (GREEN) | NO |
| L8 | 80, 14, 65, 6, 16, 11, 13, 0, 5, 15, 15, 10 | 20.8 (YELLOW) | YES |
| L9 | 0, 3, 6, 46, 30, 20, 0, 18, 0, 2, 3, 0, 0 | 9.8 (RED) | YES |
| L10 | 10, 23, 26, 26, 30, 60, 33, 18, 25, 20, 3, 70 | 28.7 (YELLOW) | YES |
| L11 | 0, 3, 6, 46, 30, 20, 0, 18, 0, 2, 3, 0, 0 | 9.8 (RED) | YES |
| L12 | 40, 36, 60, 46, 44, 51 | 46.2 (GREEN) | NO |

As shown in FIG. 6, the travel segment 601 is a strand with many traffic lights 603 and several traffic congestion profiles as obtained from probe-speeds. Table 3 shows the entire sample probe-speeds obtained on each link at the same time epoch. It also shows the naïve mean-speeds and the traffic state the mean speeds correspond to. An indication of bi-modality is also included to show that this data represents the type of problem multi-modal problem addressed by the various embodiments described herein. For example, the bi-modality is demonstrated by the HS speed profile 605*a* and the LS speed profile 605*b* indicated in FIG. 6.

Figure 7:
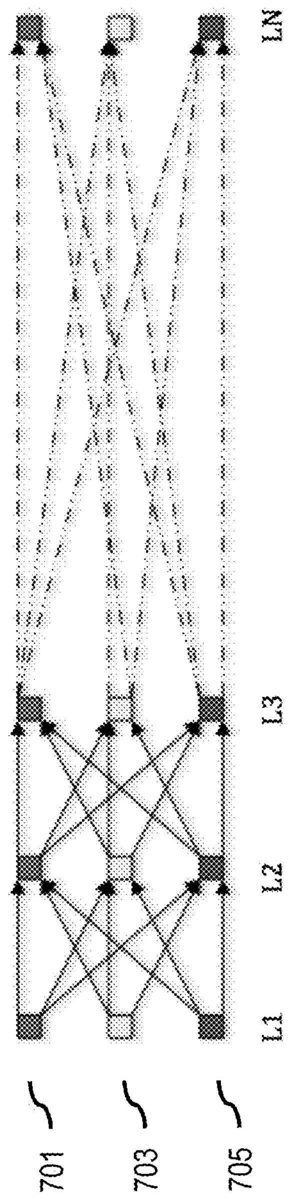
FIG. 7 is an example Hidden Markov Model trellis diagram for providing state classification for a travel segment with multi-modal speed profiles, according to one embodiment.

As indicated above, the example assumes that the possible traffic states for each link (e.g., L1-L12) are X=GREEN, YELLOW, RED. Therefore the output of the Viterbi algorithm would be a sequence of colors in X across the road segment. The HMM trellis diagram for this state-space would be as shown in FIG. 7, in which row 701 corresponds to the GREEN state, row 703 corresponds to the YELLOW state, and row 705 corresponds to the RED state.

Accordingly, the complexity of the algorithm is $O(N \cdot S^2)=O(12 \cdot 3^2)$.

It is noted that this implementation of Viterbi would be very fast computationally in production once S is NOT a large number. In one embodiment, S=3 can be used as a default value as it captures of the possible traffic states of interest. The only dynamic value is N.

Table 4 below summarizes the output of the Viterbi algorithm computation. As shown in Table 4, the Viterbi algorithm removed some false congestion and showed proper congestion states as classified by the system 100. In addition, Table 4 attaches a probe-confidence metric (PCM) by indicating which probes have potentially high PCMs. In one embodiment, the PCM is determined according to the process of FIG. 5.

TABLE 4

| Links | Probe Speeds | Mean (Color) | Viterbi-Path | Probes that get High PCM |
|---|---|---|---|---|
| L1 | 16, 35, 20, 18, 3, 21, 4, 36, 6, 6, 8, 9 | 15.2 (RED) | RED | 3, 4, 6, 6, 8, 9 |
| L2 | 16, 65, 0, 90, 18, 30, 2, 1 | 27.8 (YELLOW) | RED | 0, 2, 1 |
| L3 | 40, 36, 60, 46, 44, 51, 20 | 42.4 (GREEN) | GREEN | 40, 36, 60, 46, 44, 51 |
| L4 | 40, 36, 60, 46, 44, 51, 20 | 42.4 (GREEN) | GREEN | 40, 36, 60, 46, 44, 51 |
| L5 | 40, 36, 6, 46, 30, 20, 0, 1, 0, 2, 3, 0, 0 | 14.1 (RED) | GREEN | 40, 36, 46 |
| L6 | 40, 36, 60, 46, 44, 51, 20 | 42.4 (GREEN) | GREEN | 40, 36, 60, 46, 44, 51 |
| L7 | 40, 36, 60, 46, 44, 51 | 46.2 (GREEN) | GREEN | 40, 36, 60, 46, 44, 51 |
| L8 | 80, 14, 65, 6, 16, 11, 13, 0, 5, 15, 15, 10 | 20.8 (YELLOW) | RED | 14, 6, 16, 11, 13, 0, 5, 15, 15, 10 |
| L9 | 0, 3, 6, 46, 30, 20, 0, 18, 0, 2, 3, 0, 0 | 9.8 (RED) | RED | 0, 3, 6, 0, 0, 2, 3, 0, 0 |
| L10 | 10, 23, 26, 26, 30, 60, 33, 18, 25, 20, 3, 70 | 28.7 (YELLOW) | YELLOW | 23, 26, 26, 30, 33, 18, 25, 20 |
| L11 | 0, 3, 6, 46, 30, 20, 0, 18, 0, 2, 3, 0, 0 | 9.8 (RED) | RED | 0, 3, 6, 0, 0, 2, 3, 0, 0 |
| L12 | 40, 36, 60, 46, 44, 51 | 46.2 (GREEN) | GREEN | 40, 36, 60, 46, 44, 51 |

Table 5 below provides the final Viterbi output result in comparison to a traditional mean-based approach according to classified color coding. As shown, Table 5 indicates a more realistic and consistent transition between traffic color states as the cars traverse the travel segment 601 from L1 to L12. In one embodiment, the sequence of traffic colors outputted by Viterbi is the most likely hidden state sequence of the system, e.g., the most likely sequence of traffic condition. In an extended implementation of this model, we can take the Viterbi-path and measure the length of the contiguous congested segments (e.g. YELLOW & RED). It can also be determined that congested segments with very short length <100 m may be given lower priorities, e.g., the probes indicating congestion may get lower PCM.

TABLE 5

| Link | Mean-Based | Viterbi |
|---|---|---|
| 1 | RED | YELLOW |
| 2 | YELLOW | YELLOW |
| 3 | GREEN | GREEN |
| 4 | GREEN | GREEN |
| 5 | RED | GREEN |
| 6 | GREEN | GREEN |
| 7 | GREEN | GREEN |
| 8 | YELLOW | RED |
| 9 | RED | RED |
| 10 | YELLOW | YELLOW |
| 11 | RED | YELLOW |
| 12 | GREEN | GREEN |

It is noted that for the transition probabilities, although a more strict transition probabilities was used in the worked example, transition probabilities that are less strict could be:

$a_{GREEN,GREEN}=0.85$, $a_{GREEN,YELLOW}=0.75$, $a_{GREEN,RED}=0.6$, $a_{YELLOW,YELLOW}=0.7$, $a_{YELLOW,GREEN}=0.8$, $a_{YELLOW,RED}=0.65$ $a_{RED,RED}=0.65$, $a_{RED,YELLOW}=0.7$, $a_{RED,GREEN}=0.65$

The processes described herein for providing state classification for a travel segment with multi-modal speed profiles may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
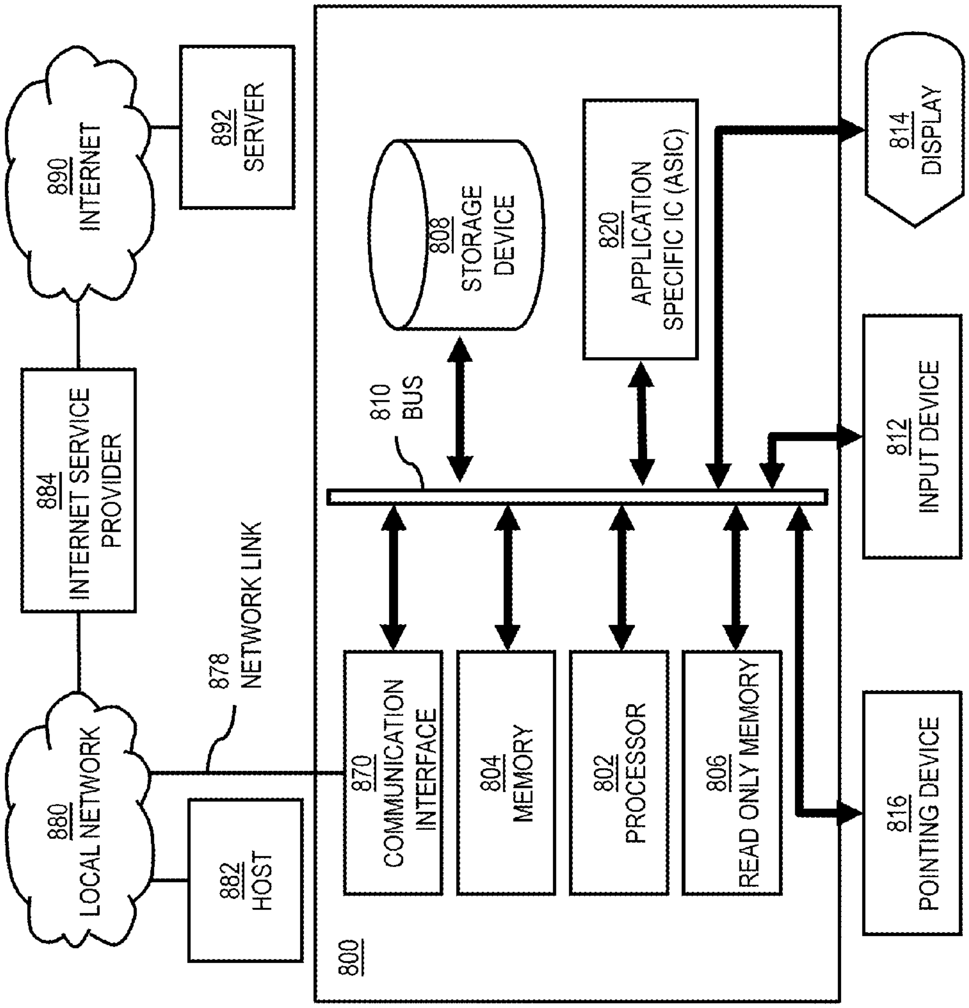
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide state classification for a travel segment with multi-modal speed profiles as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing state classification for a travel segment with multi-modal speed profiles.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing state classification for a travel segment with multi-modal speed profiles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing state classification for a travel segment with multi-modal speed profiles. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing state classification for a travel segment with multi-modal speed profiles, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing state classification for a travel segment with multi-modal speed profiles.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide state classification for a travel segment with multi-modal speed profiles as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing state classification for a travel segment with multi-modal speed profiles.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide state classification for a travel segment with multi-modal speed profiles. The memory 905 also stores the data associated with or generated by the execution of the inventive steps.

Figure 10:
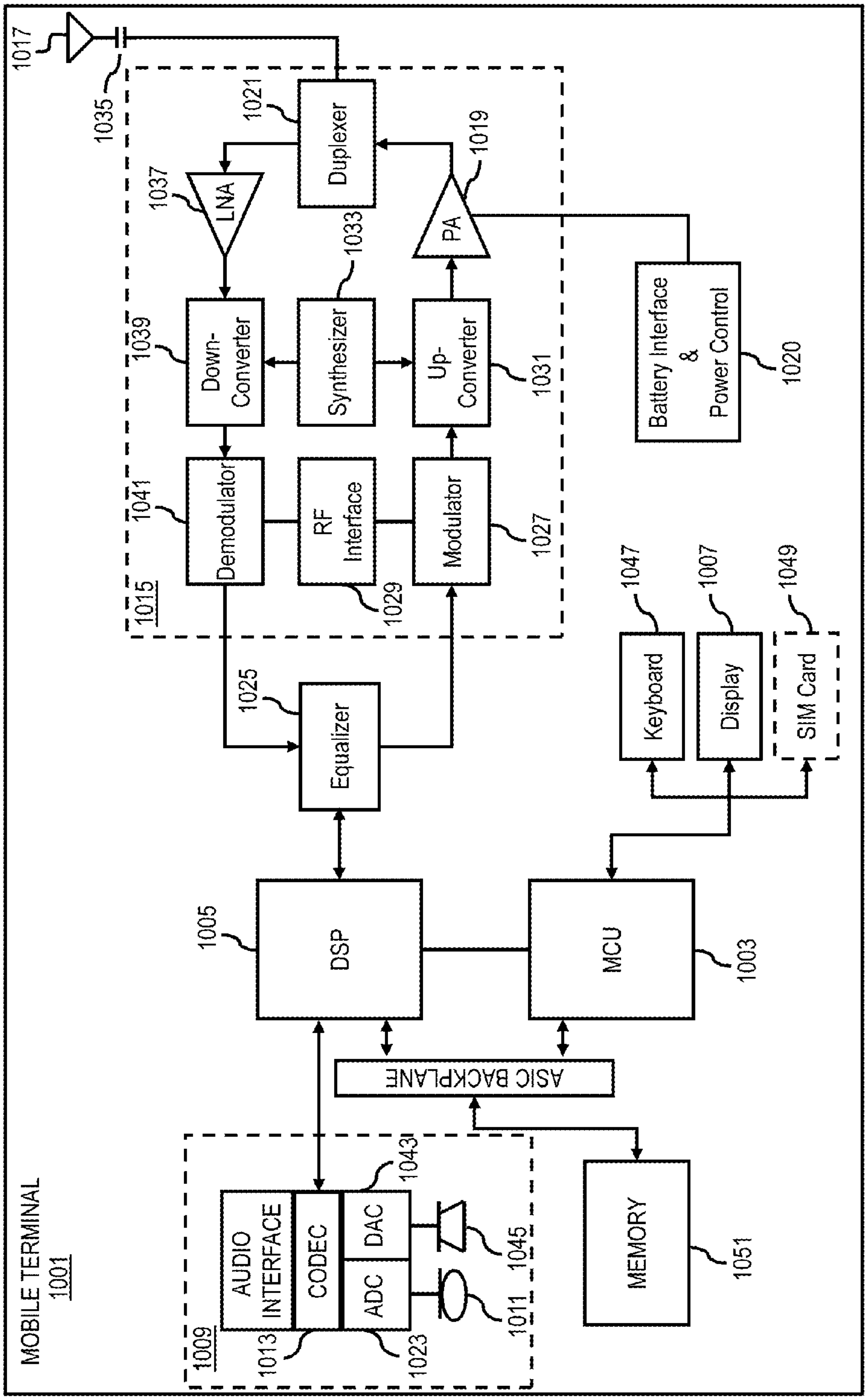
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing state classification for a travel segment with multi-modal speed profiles. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing state classification for a travel segment with multi-modal speed profiles. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide state classification for a travel segment with multi-modal speed profiles. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

processing and/or facilitating a processing of probe data associated with at least one travel segment to determine that probe data indicates a plurality of speed profiles, wherein the plurality of speed profiles represent one or more observed clusters of speed states;

determining that the at least one travel segment exhibits a multi-modality with respect to travel speed based, at least in part, on the plurality of speed profiles;

determining at least one likely sequence of speed states for traversing the at least one travel segment based, at least in part, on the one or more observed clusters of speed states and state transition probability information, wherein the state transition probability information represents one or more probabilities for transitioning among the plurality of speed states; and causing, at least in part, a classification of at least one hidden state of the at least one travel segment based, at least in part, on the at least one likely sequence of speed states.

2. A method of claim 1, wherein the determination of the at least one likely sequence of speed states, the classification of the at least one hidden state, or a combination thereof is based, at least in part, on a Viterbi algorithm.

3. A method of claim 1, wherein the at least one travel segment includes one or more traffic controls operating in one or more links of the at least one travel segment; and wherein the one or more traffic controls include, at least in part, one or more traffic stoplights, one or more crossings, or a combination thereof.

4. A method of claim 1, wherein the at least one hidden state is a traffic speed state, a traffic congestion state, or a combination thereof.

5. A method of claim 1, wherein the multi-modality is a bi-modality comprising a high-speed profile and a low-speed profile.

6. A method of claim 5, further comprising:

determining that the at least one hidden state is a high-speed state, a free traffic-flow state, or a combination thereof if the one or more observed clusters of speed states at least substantially corresponds to the high-speed profile and the at least one likely sequence of speed states is at least substantially aligned with the one or more observed clusters of speed states; and determining that the at least one hidden state is a low-speed state, a traffic congestion state, or a combination thereof if the one or more observed clusters of speed states at least substantially corresponds to the low-speed profile and the at least one likely sequence of speed states is at least substantially aligned with the one or more observed clusters of speed states.

7. A method of claim 1, further comprising:

determining the at least one likely sequence of speed states with respect to at least one spatial domain by causing, at least in part, a map-matching of the at least one likely sequence of speed states to the at least one travel segment, one or more links of the at least one travel segment, or a combination thereof.

8. A method of claim 1, further comprising:

causing, at least in part, a modeling of one or more possible hidden states, one or more state probabilities, one or more possible observed clusters of speed states, the state transition probability information, model output probability information, or a combination thereof, wherein the determination of the at least one likely sequence of seep states is based, at least in part, on the modeling.

9. A method of claim 8, further comprising:

determining probe-confidence-metric information for the probe data based, at least in part, on the modeling, wherein the classification of the at least one hidden state is based, at least in part, on the probe-confidence metric information.

10. A method of claim 8, wherein the modeling is based, at least in part, on a Hidden Markov Model.

11. An apparatus comprising:

at least one processor; and at least one memory including computer program code for one or more programs, the at least one memory and the computer program code configured to, with the at least one processor, cause the apparatus to perform at least the following, process and/or facilitate a processing of probe data associated with at least one travel segment to determine that probe data indicates a plurality of speed profiles, wherein the plurality of speed profiles represent one or more observed clusters of speed states;

determine that the at least one travel segment exhibits a multi-modality with respect to travel speed based, at least in part, on the plurality of speed profiles;

determine at least one likely sequence of speed states for traversing the at least one travel segment based, at least in part, on the one or more observed clusters of speed states and state transition probability information, wherein the state transition probability information represents one or more probabilities for transitioning among the plurality of speed states; and cause, at least in part, a classification of at least one hidden state of the at least one travel segment based, at least in part, on the at least one likely sequence of speed states.

12. An apparatus of claim 11, wherein the determination of the at least one likely sequence of speed states, the classification of the at least one hidden state, or a combination thereof is based, at least in part, on a Viterbi algorithm.

13. An apparatus of claim 11, wherein the at least one travel segment includes one or more traffic controls operating in one or more links of the at least one travel segment; wherein the one or more traffic controls include, at least in part, one or more traffic stoplights, one or more crossings, or a combination thereof; and wherein the at least one hidden state is a traffic speed state, a traffic congestion state, or a combination thereof.

14. An apparatus of claim 11, wherein the multi-modality is a bi-modality comprising a high-speed profile and a low-speed profile, and wherein the apparatus is further caused to:

determine that the at least one hidden state is a high-speed state, a free traffic-flow state, or a combination thereof if the one or more observed clusters of speed states at least substantially corresponds to the high-speed profile and the at least one likely sequence of speed states is at least substantially aligned with the one or more observed clusters of speed states; and determine that the at least one hidden state is a low-speed state, a traffic congestion state, or a combination thereof if the one or more observed clusters of speed states at least substantially corresponds to the low-speed profile and the at least one likely sequence of speed states is at least substantially aligned with the one or more observed clusters of speed states.

15. An apparatus of claim 11, wherein the apparatus is further caused to:

determine the at least one likely sequence of speed states with respect to at least one spatial domain by causing, at least in part, a map-matching of the at least one likely sequence of speed states to the at least one travel segment, one or more links of the at least one travel segment, or a combination thereof.

16. An apparatus of claim 11, wherein the apparatus is further caused to:

cause, at least in part, a modeling of one or more possible hidden states, one or more state probabilities, one or more possible observed clusters of speed states, the state transition probability information, model output probability information, or a combination thereof, wherein the determination of the at least one likely sequence of seep states is based, at least in part, on the modeling.

17. An apparatus of claim 16, wherein the apparatus is further caused to:

determine probe-confidence-metric information for the probe data based, at least in part, on the modeling, wherein the classification of the at least one hidden state is based, at least in part, on the probe-confidence metric information.

18. A computer readable storage medium including one or more sequences of one or more instructions which, when executed by one or more processors, cause an apparatus to at least perform:

causing, at least in part, an aggregation of probe data associated with at least one vehicle into at least one tunnel path based, at least in part, on a network geometry topology for at least one tunnel;

causing, at least in part, a designation of at least one probe point collected upstream of the at least one tunnel as at least one starting point of the at least one tunnel path, wherein a timestamp for the at least one probe point is a collection time of the at least one probe point;

causing, at least in part, a designation of at least one temporary probe point as at least one endpoint of the at least one tunnel path, wherein the at least one temporary probe point is downstream of the at least one tunnel and wherein a timestamp for the at least one temporary probe point is a current time; and determining at least one temporary tunnel speed for the at least one tunnel path based, at least in part, on the timestamp for the at least one probe point and the current time associated with the at least one temporary probe point.

19. A computer readable storage medium of claim 18, wherein the apparatus is further caused to perform:

determining that at least one actual probe point associated with the at least one vehicle has been collected downstream of the at least one tunnel; and determining at least one real tunnel speed in place of the at least one temporary tunnel speed based, at least in part, on the at least one actual probe point.

20. A computer readable storage medium of claim 18, wherein the apparatus is further caused to perform:

determining an estimated traffic congestion status of the at least one tunnel based, at least in part, on the at least one temporary tunnel speed.

* * * * *